(No Model.)
2 Sheets—Sheet 1.
A. J. L. LORETZ.
METHOD OF PURIFYING CANALS AND BASINS CONNECTING WITH TIDAL WATERS.
No. 299,559.
Patented June 3, 1884.
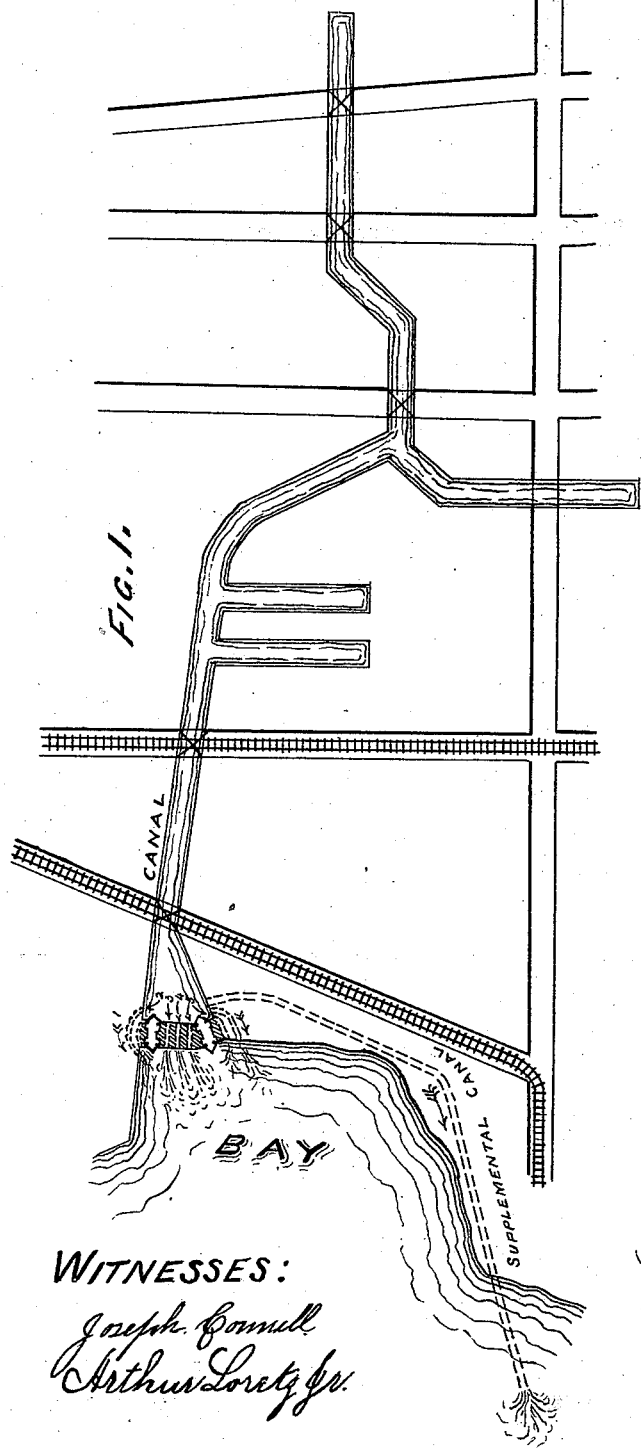
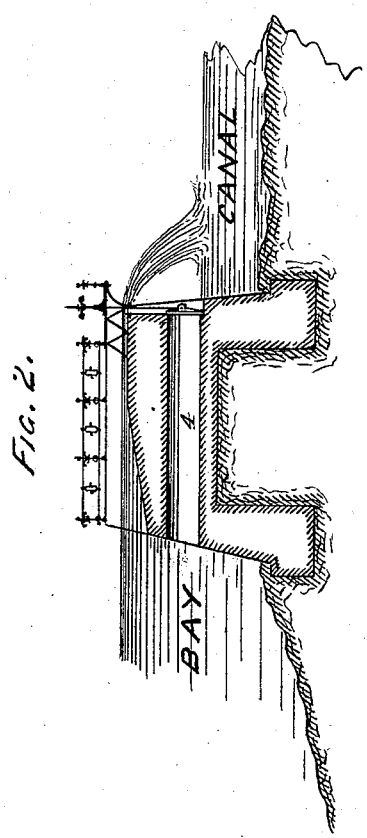
WITNESSES:
INVENTOR:

(No Model.) 2 Sheets—Sheet 2.
A. J. L. LORETZ.
METHOD OF PURIFYING CANALS AND BASINS CONNECTING WITH TIDAL WATERS.
No. 299,559. Patented June 3, 1884.
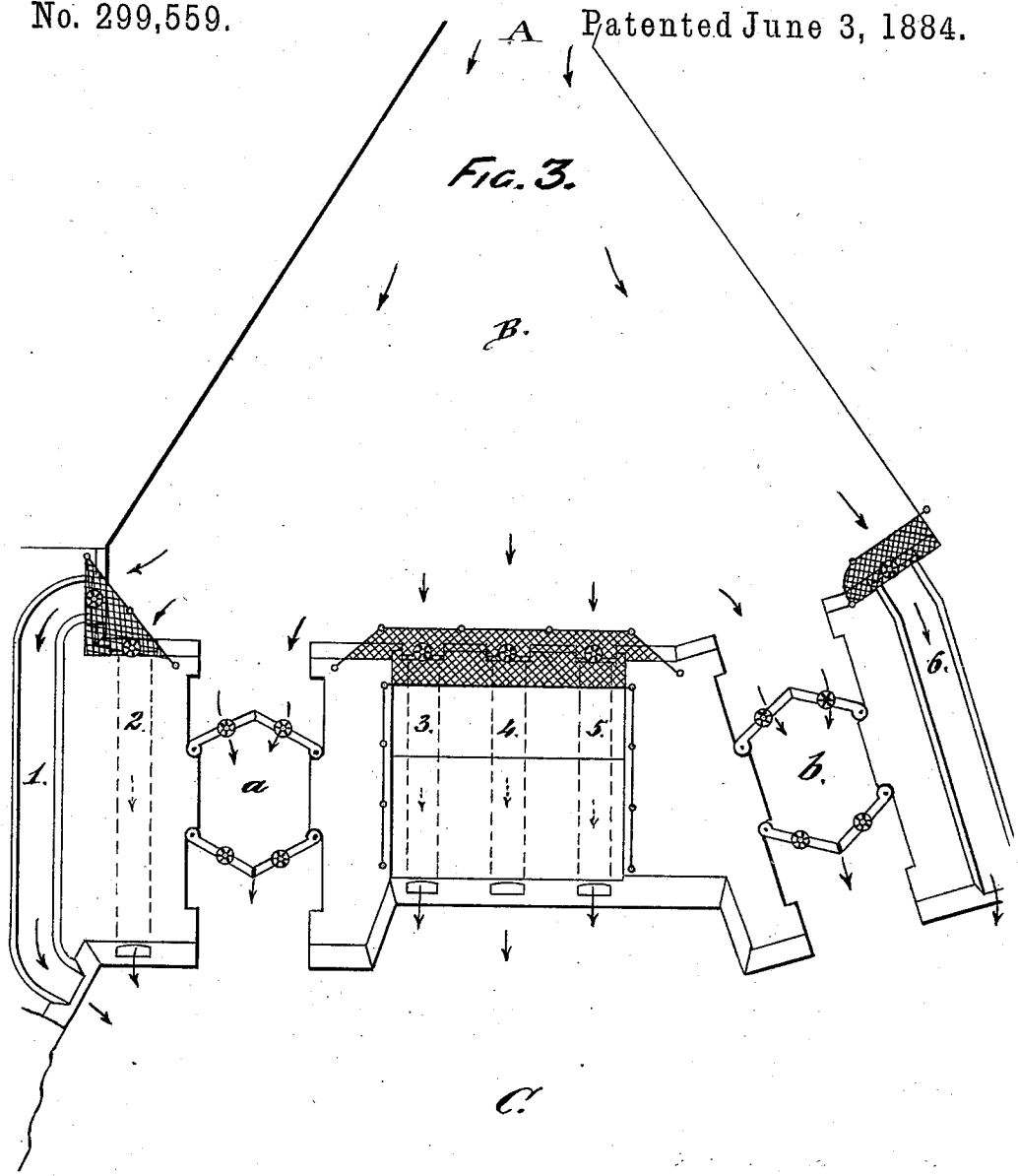

UNITED STATES PATENT OFFICE.

ARTHUR J. L. LORETZ, OF BROOKLYN, NEW YORK.

METHOD OF PURIFYING CANALS AND BASINS CONNECTING WITH TIDAL WATERS.

SPECIFICATION forming part of Letters Patent No. 299,559, dated June 3, 1884.

Application filed August 18, 1883. (No model.)

*To all whom it may concern:*

Be it known that I, ARTHUR J. L. LORETZ, of Brooklyn, in the county of Kings and State of New York, have invented a new Method of Purifying Canals and Basins Connecting with Tidal Waters, of which the following is a specification.

My invention has for its object the act of purifying canals or basins receiving their supply from or connecting with tidal waters by producing at intervals rapid currents by means of retention-gates, sluices, or other mechanical contrivances, and allowing the water to escape within a limited period or at a desired velocity not injurious to shipping, and at a much greater velocity than the natural current produced by the ebbing and flowing of tides, in order to carry off the natural and other accumulation of impurities which may have been floating and deposited therein by adjoining manufacturing establishments, sewerage, &c. As an example of my ideas of purification of such waters, I will take the Gowanus Canal of Brooklyn, which receives its supply of waters from New York Bay. This canal extends into the heart of a thickly-populated and valuable portion of the southern district of Brooklyn, and is lined on its borders with large, valuable, and extensive manufactories, some of which deposit from their productions more or less impurities therein, thereby causing disagreeable and offensive odors, more or less detrimental to the health of the population in the immediate and surrounding vicinity. This canal having numerous branches and being tortuous, it naturally follows that its current from natural tidal variations is so slow in moving the impurities to such an extent that refuse acids, oils, and other impure substances floating on the surface will barely reach the inlet or mouth of the canal at the outgoing tide, and hence be returned therein at the incoming of same, the tide producing, as it were, but a slow pulsation of impurities on the surface of the canal-waters, and which impurities are continually increasing. Now, by placing both retaining and resisting gates, as represented, at the mouth of the canal, neither the outgoing or incoming tide in the bay can affect the motion or depth of water in the canal. Again, if at a period of the beginning of the outgoing tide in the bay, or just prior thereto, the retention and run-around gates, &c., be closed until the tide is at its lowest in the bay, then by opening the run-arounds the outward current in the canal may be increased at pleasure to the extent of the capacity of gates in run-around chamber, gates, &c. Supposing the average fall of the tide to be seven feet, an idea may be obtained of the velocity that can be produced during the reversal of the tide of a stream with gate capacity equal to its width and depth and a fall of seven feet. Now, if the resisting-gates, &c., be closed after the swift passage of impurities and as the tide begins to return, and no water be allowed to enter the canal until at high tide, then we shall have a clear supply from the high waters in the bay, which will be admitted over a weir into the canal and through gates, if deemed expedient; and if a small supply canal or flume be extended into the bay for some distance, a still better supply of purer water could be obtained to fill the canal. Producing such alternate changes as above specified but twice in twenty-four hours on the first day of each week, when shipping is at a standstill, would be sufficient to keep the said canal pure and wholesome, and an agreeable acquisition, in lieu of a nuisance, to the neighborhood.

The supplemental canal or flume hereinbefore referred to may be used, also, to carry off the impurities at a distance from the entrance or mouth of the canal; or two may be constructed running in a diverging direction from the mouth of the canal into the bay, one for the delivery of impurities at low tide and the other for the fresh supply at high tide; but these changes and additions would add considerably to the cost of such an undertaking.

Figure 1 represents the canal herein referred to, with the principal intersecting streets crossing the same by draws, and showing at its mouth a dam with gate-chambers *a b*, also run-arounds 1, 2, 3, 4, 5, and 6, and supplemental canal to receive clear supply, or as hereinbefore specified. Fig. 2 represents on a large scale a sectional elevation of the same through run-around No. 4, showing on top the weir over which the fresh supply enters the canal and bridge-work, with hand-wheels for operating gates, &c. Fig. 3 represents a plan of dam on the same scale as Fig. 2.

A is the inlet of canal; B, the inlet-basin, and C the dam facing the bay. *a* and *b* are the retention and resisting gate chambers, provided with gates to resist the action of water in both directions, and provided with sluices, &c. These gates are always kept open during the time that the canal is open for navigation, and only closed at the proper time when the purifying process takes place. Having an inlet-basin, B, not only facilitates the entrance and outlet of the canal, but reduces the harshness and pressure of a swift current in the canal A prior to and during the opening and closing of lock-gates in chambers *a* and *b* while all the run-arounds 1 2 3, &c., are open. These gates are invariably manipulated after the run-arounds when the canal is being exhausted.

I am aware that artificial weirs have been formed by the erection of reservoirs to hold tidal waters, which were released at intervals for the purpose of creating an under current to carry off deposits of sand, silt, &c., which will naturally accummulate in harbors not receiving the outlets of fresh water-courses, and also am aware of the manner in which the ordinary mechanical devices were used for the purpose of accomplishing these results, which were but ordinary mechanical expedients, none of which can be claimed; but the above reservoirs were formed, naturally enough, in the background of such harbors, received their supply from said harbors, and whatever impurities were contained in the harbor were admitted into the reservoirs, subjecting the latter to the same accummulation of deposits.

My invention consists of a combination or organization of the elements which are the ordinary mechanical expedients used in hydraulics, and produce without the aid of reservoirs a current the maximum speed of which would carry away the shore-line of any canal or river, and again can be regulated from the above speed to such a degree that its motion can hardly be perceptible, the force of the greatest current in the canal affecting my motive structure as little as that of the slowest.

My device or structure consists of an inlet-basin, B, Fig. 3, in the form of a triangle, with two sides forming a shore-line, A being the inlet of canal or the apex of the triangle, and dam C, facing the bay, being the base or third side of the triangle. In the dam C or base of the triangle I make use of all the mechanical expedients well known in hydraulics, such as the double locks with the resisting and retention gates, provided with sluices and their operating mechanisms, run-arounds provided with sluices for the purpose of controlling the speed of the current, the openings of the latter being calculated to be not less than ten per cent. greater in cross-sectional area than that of the canal. The advantage and object of the triangular construction will be readily understood in addition to giving at its base a wide field for the operating mechanism and admitting of strong and easy organization of the various contrivances of gates, &c. The great point aimed at is to allow the water where handled—namely, at the base of the triangle—to be so diminished in its force or speed that the action upon the gates, and especially the double locks, when being opened at *a* and *b*, will be so subdued as to admit of their being handled with ease. If we suppose, now, that the entire gate capacity of dam C be open—which is ten per cent. greater than the cross-section of the canal, outside of the area of the locks or in addition to the same—the outgoing current at A can be imagined with a fall of seven feet, while at the gates or base of the triangle it is subdued, owing to the proportions of width and distance of the base C to and from the apex or inlet of canal A. It will be also found that the triangular form of current motor or construction is the cheapest. With the above I combine one or more supplemental canals or flumes, extending some distance from the basin into the bay, which may be used for receiving a fresher supply into the canal than that received from the immediate vicinity, or may be used to carry off the floating or more offensive matter to a greater distance than it would be carried by the natural tide after leaving the basin of the canal, and prevent its return at high tide over the weir, as at Fig. 2. These supplemental canals are to be provided with the same devices as the run-arounds in the dam C.

Having now explained my invention, what I claim is—

A triangular basin, B, whose apex A is the inlet of a canal, and its base C forming a dam, arranged substantially as and for the purpose described, with locks, gates, weirs, run-arounds, and supplemental canals.

ARTHUR J. L. LORETZ.

Witnesses:
ARTHUR LORETZ, Jr.,
JOS. CONNELL.